United States Patent [19]

Shadden

[11] Patent Number: 5,829,952

[45] Date of Patent: Nov. 3, 1998

[54] CHECK VALVE WITH A REVERSIBLE VALVE BALL AND SEAT

[76] Inventor: Darrel W. Shadden, #4 Longhorn Rd., Mineral Wells, Tex. 76067

[21] Appl. No.: 864,871

[22] Filed: May 13, 1997

Related U.S. Application Data

[63] Continuation of Ser. No. 444,255, May 19, 1995, abandoned.

[51] Int. Cl.⁶ ........................................... F04B 7/00
[52] U.S. Cl. .................... 417/514; 417/547; 137/533.25; 137/901
[58] Field of Search ..................... 417/514, 547, 417/555.2; 137/533.25, 527, 901

[56] References Cited

U.S. PATENT DOCUMENTS

| 160,800 | 3/1875 | Walker | 137/533.25 X |
|---|---|---|---|
| 654,484 | 7/1900 | Nygren | 137/901 X |
| 5,407,333 | 4/1995 | Lambright | 417/514 |

*Primary Examiner*—Charles G. Freay
*Attorney, Agent, or Firm*—Michael Roebuck

[57] ABSTRACT

A reversible valve ball assembly for use in a down-hole pump oil field check valve. The reversible valve ball can be removed, inverted and reinserted into the check valve to provide a new valve ball sealing surface. The reversal of the valve ball is performed after the original valve ball sealing surface has worn and deteriorated so that it can no longer seat properly to form a seal between the valve ball surface and a valve seat. The valve seat is also reversible. A set of irregularly shaped valve ball guide arms are provided which rotate within valve guide apertures to provide a cleaning action between the valve guide apertures and valve ball arms to prevent accumulation of debris which tends to immobilize the reciprocating valve ball. An elongated gas-breaker fin is provided and can be used to prevent gas lock. The gas-breaker fin enables a reduced vertical length for the valve ball arms so that a reversible symmetric valve ball assembly can be utilized. The gas-breaker fin enables manufacture of a pump using closer valve spacing thereby reducing the compression chamber volume and increasing the compression in the pump chamber, to reduce gas lock and increase durability of the apparatus.

9 Claims, 4 Drawing Sheets

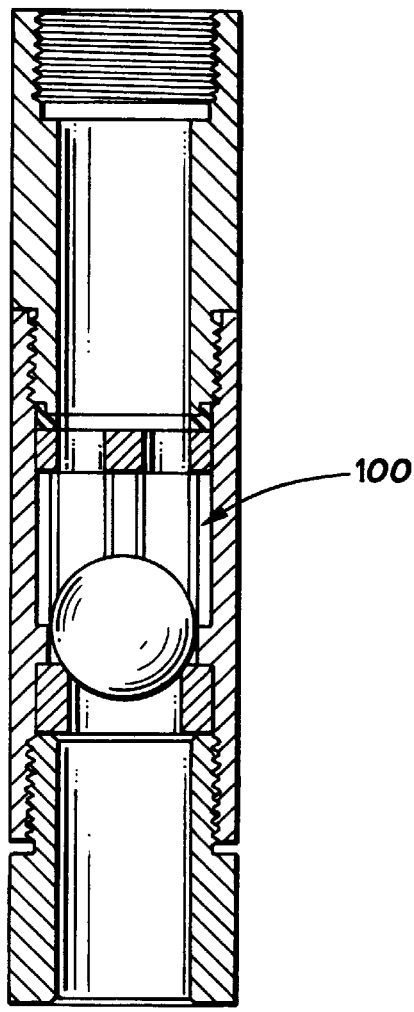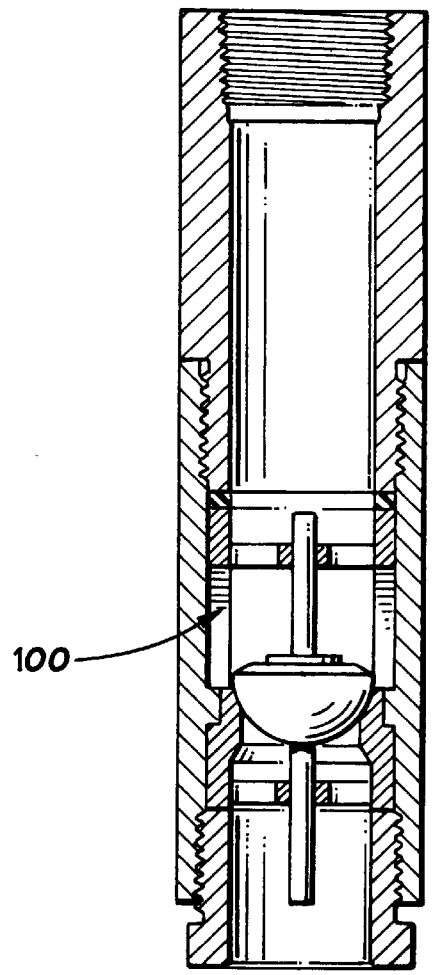
FIG. 1
(PRIOR ART)
FIG. 2
(PRIOR ART)

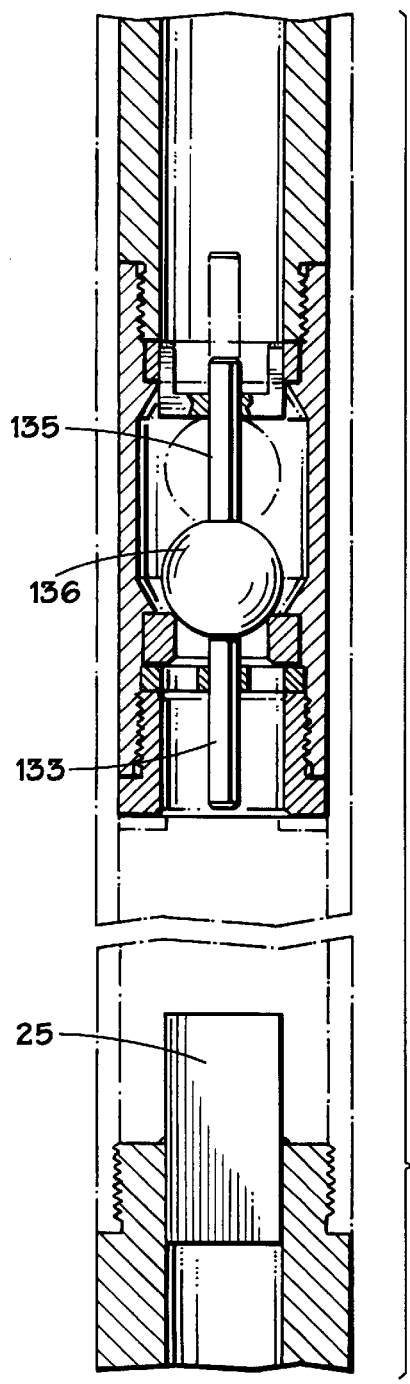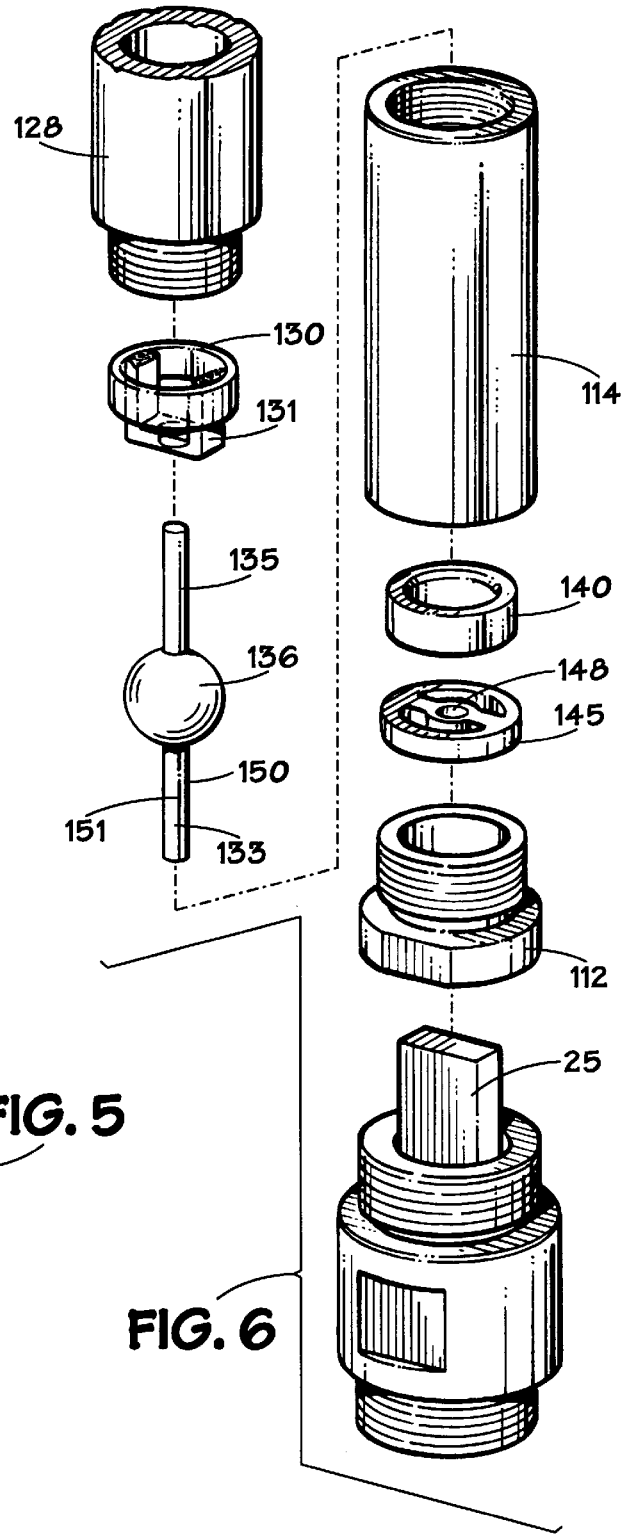
FIG. 5
FIG. 6

CHECK VALVE WITH A REVERSIBLE VALVE BALL AND SEAT

This is a continuation of U.S. patent application Ser. No. 08/444,255 filed on May 19, 1995, now abandoned.

BACKGROUND OF THE INVENTION

1. Field of the Invention

The present invention relates generally to check valves for use in oil recovery and particularly to a check valve having a reversible ball and seat.

2. Related Art

Down-hole reciprocating oil field pumps are commonly utilized for extracting or pumping fluids from the bottom of a well bore beneath the surface of the earth or beneath the surface of an ocean floor. Down-hole reciprocating oil field pumps transmit fluids such as oil, or mixtures of particulate matter and fluids to the surface where the fluids are captured. Down-hole pump valves are well known in the art.

In general, the typical down-hole pump valve is comprised of an outer tubular housing which encloses a reciprocating valve ball. In its operational state, the typical valve ball and valve housing in which the valve ball resides are attached in-line with the down-hole pump plunger or pump barrel. This is accomplished via mechanical engagement of complimentary threads in a bore and thread arrangement formed in the valve housing and adjacent sections of the valve housing or pump plunger or pump barrel.

Down-hole rod pumps typically incorporate a pair of ball and seat-type check valves which are commonly referred to as a standing valve and a traveling valve. Typical valve designs are well known in the art. The typical valve structure is comprised of a bottom nose sub-assembly, a barrel and a top sub-assembly. The two sub-assemblies and barrel are screwed together via complementary interlocking threads and bores which are formed in adjacent sections of the typical valve structure. Once interconnected, the typical valve assembly serves as the valve housing. The typical valve housing provides a rigid structure which contains the internal elements of the valve. These internal valve elements typically comprise an annular valve seat, a cylindrical cage, and a ball or plunger. One example of a known valve design is discussed in McConnell et al., U.S. Pat. No. 5,117,861.

Typically, the valve seat is inserted into the valve housing and abuts an annular shoulder therein. The valve housing shoulder is typically formed on the interior surface or wall of the barrel portion of the valve housing assembly. The valve seat slides into the housing and fits adjacent the annular housing shoulder. The lower portion of the housing then screws in place to fix the valve seat in place. The lower housing sub pressed against the valve seat and adjacent housing shoulder. Thus, the valve seat is held in place between the lower housing sub and the shoulder to form a seal and prevent translational movement along the longitudinal axis of the valve assembly housing.

During operation, the valve seat typically abuts a valve ball or plunger to form a line or circumferential seal inside of the valve. The valve seat and the valve ball or plunger form a line seal at their line of contact. This seal prevents flow through the internal passageway of the valve housing, thus checking the flow in the pump.

The McConnell valve utilizes a cage structure and hemispherical-shaped valve plunger. The cage is inserted into the valve housing. The McConnell cage structure seats against a shoulder formed on the internal surface of the barrel or plunger. The cage is held in place by screwing the top portion of the valve housing assembly onto the barrel or down-hole plunger, thereby engaging the cage and holding it fast against a shoulder formed on the interior surface of the barrel or down-hole plunger.

In McConnell, a cage with transverse guide member guides the valve ball or valve plunger back and forth, along its translational path of reciprocation parallel to the longitudinal axis of the valve housing. During operation, the typical valve plunger reciprocates within the cage or housing. The translational displacement of the valve plunger is limited so that the valve plunger travels within a specific distance. The valve ball's translational path is limited at one end by a valve seat and at the other end by a stop bar formed in the cage. The valve cage provides a plurality of ribs which in turn form a plurality of windows or apertures, one window formed between each pair of adjacent ribs.

The ribs form a cylindrical structure having an internal diameter slightly larger than the diameter of the valve ball. Thus, the valve ball fits loosely within the ribs formed in the cage. The structure of the McConnell valve, however, inherently limits flow rate by including the valve cage in the valve chamber. This reduces the size of the valve chamber and thus reduces the potential flow rate. Inclusion of the cage also reduces internal diameter of the valve chamber, thereby reducing the maximum diameter valve ball which will reciprocate within the internal diameter of the cage which is reduced from the internal diameter of the housing. Thus, a cage reduces the available flow rate for given power applied to a pump. Moreover, the cage is less durable than solid tubing, which limits the useful life of the valve due to deterioration of the cage. The ribbed cage design is structurally weakened by the aperture formed between the cage ribs. The cage apertures make the cage more susceptible to mechanical failure due to stress exerted upon the cage ribs during tightening of the valve assembly threads.

The flow rate for a given power input determines the efficiency of a pump. Unnecessary structural limitations on the available flow rate are usually unacceptable, especially in the oil industry. Efficiency is critical in the oil recovery industry where the costs of recovery are extremely high. In some instances the operating costs of recovery are prohibitively high. In these cases, potentially productive oil wells are sealed because the operating costs of recovery exceed the potential revenues from recovering the oil. The valve cage, weakened by the apertures and supported only by the cage ribs weakens the valve structure and can contribute to premature valve failure. Limitations on useful life increase the operating cost of recovery as well. Cage or valve failures are costly due to down time caused by pump failure and the cost of pulling the pump from the bottom of the well. Moreover, the cost of replacement parts increases operating expenses and the overall recovery cost.

Thus, there is a need for a check valve design which increases flow rate efficiency without weakening the valve structure, thereby reducing its useful life. There is also a need for a pump valve structure which provides for longer operating life and easy field replacement and repair of worn valve components.

Check valves for down-hole rod pumps are well known in the art. U.S. Pat. No. 5,117,861 filed May 29, 1990 by McConnell et al. and issued Jun. 2, 1992 for a "Ball and Seat-type valve for Down-hole Rod Pump", teaches a reciprocating valve for a down-hole pump. U.S. Pat. No. 5,297,579 filed Apr. 14, 1992 by McConnell and issued May 29, 1994 for a "Ball and Seat-type Check Valve for Down-hole Rod Pump" teaches a reciprocating check valve for a down-hole pump. Neither of these patents, or any other patent or device known to the inventor provides the structure, features and advantages which are provided by the present invention.

FIG. 1 illustrates a typical ball and seat check valve in cross-section. Typically, a check valve comprises a bottom nose sub-assembly, a barrel member and a top sub-assembly. The typical valve components are tubular and are screwed together end to end to form the tubular housing of the valve. Typically the internal components of the valve comprise an annular seat member, a damper, a cylindrical cage, and a plunger member. The valve seat member is typically inserted into the bore of the known barrel from the bottom. The valve seat member abuts an inwardly projecting ring shoulder formed on the surface of the valve housing interior wall. Typically the valve seat member is held in place against the ring shoulder by support from below by the nose sub-assembly as the nose sub-assembly is screwed into place. The seat member provides an annular valve seat against which the ball member seals. This seal eliminates flow through the check valve.

The typical nose sub-assembly, seat member and barrel combine to form a seal below the ball and seat seal. In a known pump, the cage member is typically inserted through the top end of the valve housing and seats on the projecting ring shoulder formed on the interior wall of the valve housing. The cage member is held in place between the annular ring seal and the top sub. A damper is included to absorb or dampen the mechanical stress transmitted to the cage structure.

Typically, the side walls of a cage form interspersed apertures which are separated vertically by ribs which are attached to a circular ring at the top and bottom of the valve cage. The ribs are comprised of the extended vertical portions of the cage which remain after the cage apertures are formed. The cage ribs are typically referred to as guide ribs.

SUMMARY OF THE INVENTION

The present invention is directed toward providing a reversible check valve structure, for a down hole rod pump, characterized by increased flow capacity, longer service life, reduced input power requirements for given flow rate, and a reversible valve ball and valve seat assembly which may be easily removed and reinstalled by field service personnel to replace the existing valve ball and valve seat sealing surfaces which have become worn without the need for additional parts.

In a preferred embodiment of the present invention, the reversible valve ball and seat comprises a symmetrically shaped valve ball. The valve ball comprises a spherical-shaped valve ball body which is smaller in diameter than the internal diameter of the valve housing in which it reciprocates. Thus, the valve ball freely moves or translates within the valve housing in which it resides. The clearance between the sides of the valve ball and housing is increased due to the absence of the cage. Moreover, the valve chamber space formerly occupied by the valve cage is now added to the flow volume of the chamber which increases the available flow rate. The valve housing is fashioned from a cylindrical section of tubing. In a preferred embodiment the valve housing comprises a solid piece of cylindrical tubing.

The cageless solid tube valve housing of the present invention provides substantially more resistance to mechanical stress than an insert cage structure. The cage is weakened by the apertures formed in the cage. The cage ribs can be cracked and rendered inoperative by over tightening adjacent sections during installation. Thus, the cageless solid tubular housing of the present invention is less susceptible to failure due to mechanical stress imposed on the housing by the tightening, tapping and mechanical fatigue inherent in oil field recovery techniques. The solid-tube housing provides a longer operating life than a valve structure which incorporates a cage.

Moreover, the valve ball and valve seat of the present invention are reversible. When the sealing surfaces on the valve ball and valve seat are worn so that a line seal is no longer formed between the valve ball and valve seat sealing surfaces, the reversible valve ball and reversible valve seat enable a field service technician to replace worn valve ball and valve seat sealing surfaces with new surfaces using the existing valve ball and valve seat. The service technician provides a new valve ball and a new valve seat sealing surface by removing, reversing and reinstalling the existing valve ball and valve seat of the present invention. Once the reversible valve ball is reversed and reinstalled, what was once the upper surface of the valve ball which did not contact the valve seat, is now the lower surface of the valve ball which now contacts and forms a seal with the valve seat. Once the reversible valve seat is reversed and reinstalled, what was once the lower surface of the valve seat which did not contact the valve ball, is now the upper surface of the valve seat which now contacts and forms a seal with the valve ball. Thus, the valve ball and valve seat sealing surfaces are renewed by the removal, reversal and reinstallation of the existing reversible valve ball and valve seat of the present invention.

In an alternative embodiment the present invention provides an improved gas breaker mechanism. In an alternative embodiment a transverse gas breaker fin is provided beneath the traveling valve. The gas breaker fin engages the lower arm of the reversible valve ball thereby opening the traveling valve to prevent gas lock. As shown in FIG. 2, a typical gas breaker mechanism provides a stopping member or trip stem as shown in McConnell, U.S. Pat. No. 5,249,936. McConnell provides a stopping bar member comprising a horizontal bar positioned below the traveling valve. The horizontal bar is oriented perpendicular to the longitudinal axis of the pump valve and positioned so that the elongated lower valve guide arm of the traveling valve contacts the horizontal bar at the bottom of a pump stroke. The trip stem forces the traveling valve open each time the down-hole piston reaches the bottom of a pump stroke. Thus, the McConnell structure provides a stem to serve as a mechanical gas-breaker mechanism.

BRIEF DESCRIPTION OF THE DRAWINGS

FIGS. 1 and 2 are cross-sectional diagrams of prior art check valves;

FIG. 5 is a cutaway of a section of a down-hole rod pump showing a closed tubular housing or tubing and valve guide seats which are formed on the interior surface of the tubing which are utilized in a preferred embodiment of the present invention;

FIG. 6 is a exploded view of a reversible valve ball and seat as provided in an alternative embodiment;

DETAILED DESCRIPTION OF A PREFERRED EMBODIMENT OVERVIEW

Figure 3:
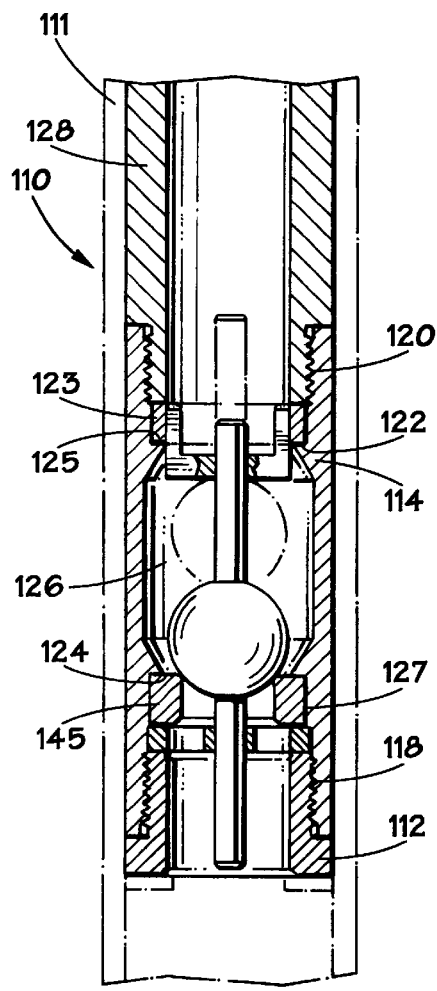
FIG. 3 is a cutaway of a section of a down-hole rod pump showing a closed tubular housing or tubing and valve guide seats which are formed on the interior surface of the tubing which are utilized in a preferred embodiment of the present invention.

The present invention provides an improved check valve structure. Unlike other valves, of which the inventors are aware, the present invention provides a reversible valve ball and valve seat member. The reversible valve ball of the present invention is comprised of a spherical ball body having two valve ball arms 134 and 135 extending radially from the center of spherical valve ball 13C in diametrically opposing directions. In operation, the arms are aligned along the longitudinal axis of the down hole rod pump. Valve guides members having valve guide apertures 129 and 148 are provided. The valve ball arms protrude from opposite sides of spherical valve ball 13C. Each arm slides within a valve guide aperture.

The valve ball arms slide within the valve guide. The valve 131 and 145 guides maintain the spherical valve ball body reciprocations to a line substantially within the center of the valve chamber and along the longitudinal axis of the cylindrical valve housing 114 in which the ball assembly resides. As the reversible valve ball reciprocates along the longitudinal axis of the housing, the valve ball arms slide within the valve guide apertures 129 and 148 to provide a means for guiding the reciprocating valve ball along the longitudinal axis of the valve housing. The valve guides also ensure that the ball member repeatably and consistently seals with the valve seat.

Unlike a typical valve ball as shown in FIGS. 1 and 2, the present invention, however, does not utilize a cage 100 but instead provides a cylindrical housing without apertures. The cageless structure of the present invention reduces or altogether eliminates the need for a dampening member. The dampening member is not needed in the present invention due to the superior structure and durability of the present inventions cageless structure.

The guide member apertures 129 and 148 are preferably circular and substantially larger in diameter than the valve ball arms. Thus, particles or debris are less likely to accumulate between the valve ball arms 134 and 135 and the valve guide apertures 129 and 148. Accumulation of debris between the arms and apertures retards free reciprocation of the valve ball and arms within the apertures of the valve guide. The valve ball arms tend to rotate within the valve guide apertures as the valve ball assembly reciprocates. The sides of the valve ball arms 134 and 135 are irregularly shaped. The irregular shape of the valve ball arms provide an abrasive or particle-disruptive cleansing action between the valve ball arms and the valve guide apertures.

The features of the present invention provides numerous advantage over known valve structures. The present invention provides for an increased internal diameter and associated increase in potential flow rate over known valve mechanisms. The present invention provides a solid housing cageless structure, which is more durable. The valve's durability increases expected operating life, thereby reducing operating costs associated with use of the valve. The present invention provides a reversible valve ball 136 with symmetric arms 134 and 135 which enable a field service technician to replace and renew the sealing surfaces of the valve ball with the old or existing valve parts. The technician renews the worn sealing surfaces of the reversible valve ball and valve seating surfaces by removing, reversing and reinstalling the existing valve ball and seat.

Two irregularly-shaped valve ball arms are provided by the present invention. The movement of the irregular surface of arms 134 and 135 within the circular valve guide apertures provides a self cleaning action to remove dirt and debris from between valve ball arms and the valve guide apertures. In a preferred embodiment, the valve ball arms have an alternately flat 134 and concave shape 138. In an alternative embodiment, the valve guide apertures 129 and 148 are irregularly shaped and the guide members are cylindrical. In yet another alternative embodiment, the valve guide arms have an alternatively round surface, flat surface and concave surface. In still another alternative embodiment the valve guide arms are alternatively round and concave.

Thus, the reversible check valve ball can be in service until the sealing surface on the ball or seat 140 is worn and then removed, reversed and reinserted to provide a new valve ball sealing surface, thereby increasing the useful life of the valve ball. The valve seat is also reversible. The valve seat may also be removed, reversed and reinstalled to provide a new sealing surface on the valve seat.

In a preferred embodiment, the present invention provides a closed tubular housing structure. One feature of this closed tubular housing is that the conventional cage ribs and apertures which weaken the structure, are eliminated. The removal of the cage from the interior of the valve provides additional flow area, which is an advantage of the preferred check valve structure. Another advantage of the tubular housing structure is that a conventional valve seat may be utilized with the reversible valve ball assembly of the present invention.

The reversible valve ball assembly and valve seat provided by the present invention may be oversized, undersized or conventional sized. The valve ball 136 is preferably spherical, however, alternative shape are appropriate as long as the radius of the valve ball matches the radius of the valve seat upon which it seats and seals. The valve ball is preferably symmetrical to enable reversal of the ball of the valve ball assembly. The ball body of the present invention may be spherical, ellipsoid, or any other shape.

As the valve ball member translates along its longitudinal axis of reciprocation, valve guide apertures contain and guide the valve ball arms and attached valve ball to facilitate consistent and repeatable seating between the valve ball and the check valve seat. One advantage of this feature is that the valve ball arms and the valve guide apertures provide a consistent path for the reciprocating motion of the valve ball. Another advantage of the valve guides and valve ball arms structure is that the valve guides prevent the valve ball from touching the interior wall of the valve housing 114. This reduces friction and associated wear on the valve guide ball and eliminates deterioration of the valve ball caused by the valve ball rubbing against the interior surface of the valve housing.

In a preferred embodiment of the present invention, the flow rate for a given applied power input is substantially increased over known valve structures. In general, the limiting factor of flow rate through a section of down-hole tubing is the internal diameter of the tubing. The flow area adjacent the valve ball and seat is the limiting factor or "bottleneck" in the overall flow through the pump and the flow through the valve.

In a preferred embodiment, the reversible ball and seat structure of the present invention provide a structure which enables increased flow rate through a down-hole pump, thereby reducing operating costs for electrical power required to achieve a given flow rate. Thus, the reversible valve ball and valve seat of the present invention extends the useful life of the valve ball 136 and reduces the power required to continuously run the pump at a particular flow rate.

In a preferred embodiment, for constant power applied, the present invention enables a 20% to 118% increase in flow rate over known valve flow rates, as shown in the Flow Rate Increase Chart, below. As shown in the following FLOW RATE CHART below, the present invention provides structure which enables a pump to attain a 105% increase in flow rate over known valves and a 44% increase in flow rate over the McConnell valve for a 1¼ valve with a standard size valve ball body. The present invention provides a structure which enables a 76% increase in flow rate over known valves and a 25% increase in flow rate over the McConnell valve for a 1½ valve with a standard size valve ball body or plunger. The present invention provides a structure which enables a 100% increase in flow rate over known valves and a 20% increase in flow rate over the McConnell valve for a 1¾" valve with a standard size valve ball. The present invention provides for a 118% increase in flow rate over known valves and a 31% increase in flow rate over the McConnell valve for a 1¾" valve with a reduced size valve ball.

FLOW RATE INCREASE CHART

| VALVE SIZE | STANDARD PLUNGER SIZE | | REDUCED PLUNGER SIZE | |
|---|---|---|---|---|
| | KNOWN | McCONNELL | KNOWN | McCONNELL |
| 1¼" | 105% | 44% | | |
| 1½" | 76% | 25% | | |
| 1¾" | 100% | 20% | 118% | 31% |

Turning now to FIG. 3, a preferred embodiment of the present invention is shown. FIG. 3 is a cutaway of a section of a down-hole rod pump showing a closed tubular housing 114. The interior surface 128 of tubular housing 114 provides annular upper valve guide seat shoulder 122 and annular lower valve guide seat 124. Upper valve guide seat 122 and lower valve guide seat shoulder 124 are formed on the interior surface 128 of the tubing.

In a preferred embodiment, the present invention comprises a closed cylindrical tubing or tubular housing 114, which screws into a lower section of a down hole pump barrel 111 or the lower end of a pump plunger 121 of a down-hole pump 110 by means of screw threads 120 which are formed on the interior surface of tubular housing 114.

Figure 4:
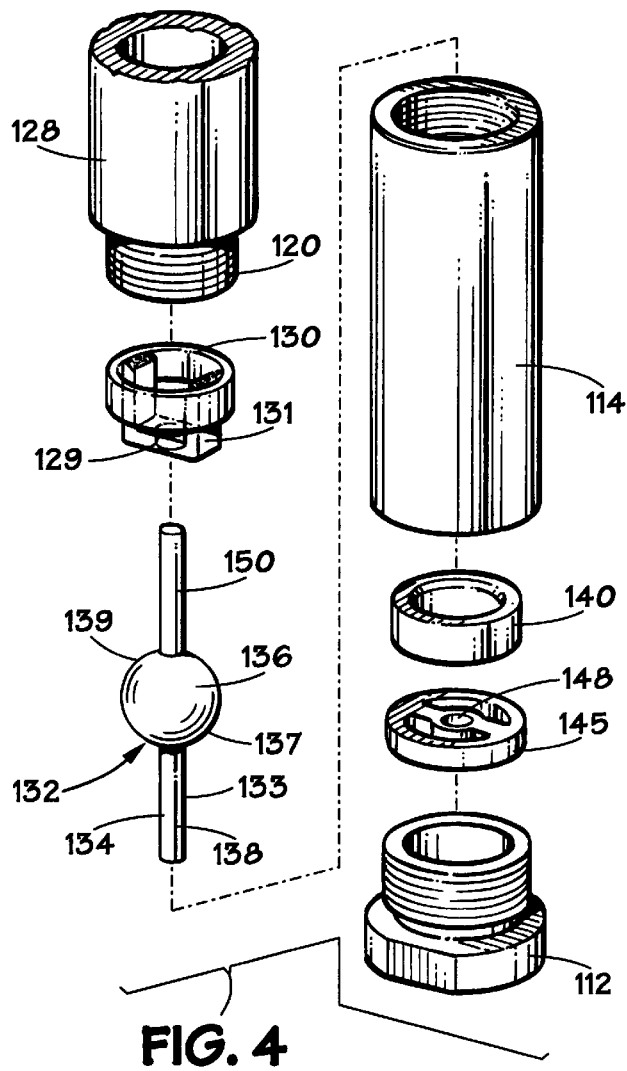
FIG. 4 is a exploded view of a check valve with a reversible valve ball and seat as provided in a preferred embodiment.

Turning now to FIG. 4, upper valve guide 131 fits inside of housing 114 and annular ear 130 abuts the valve guide seat shoulder 122 which is formed in the interior wall of tubular housing 114. Upper valve guide 131 provides annular ear 130 which is formed in the upper portion of upper valve guide 131. Annular ear 130 fits within the area 123, as shown in FIG. 3, between threads 120 and upper surface 125 of valve guide seat shoulder 122. Threads 120 manifest an internal diameter which is slightly smaller than the outside diameter of annular ear 130, thus mechanically engaging and fixing upper valve guide 131 between seat surface 125 and pump plunger 121. Thus, the structure fixes the upper guide along the longitudinal axis of the tubular housing 114.

Valve seat 140 and lower valve guide 145, fit within the area 127, shown in FIG. 3, which exists between lower valve seat surface 124, and the lower end threads 118, which manifest an internal diameter which is slightly larger than the outside diameter of lower valve guide 145 and valve seat 140, thus fixing lower valve guide 145 and valve seat 140, by means for threads 118 and 112, along the longitudinal axis of the tubular housing 114. Member 112 fits into the lower end of tubular housing 114 and abuts lower valve guide 145. Reversible valve ball assembly 132 reciprocates within open area 126, shown in FIG. 3, formed inside the internal diameter of tubular housing 114.

As shown in FIG. 4, upper valve guide 131 provides a valve guide aperture 129 which is formed in the center of upper valve guide 131. Lower valve guide 145 provides valve guide aperture 148 formed in the center of lower valve guide 145. In a preferred embodiment, upper valve ball arm 135 and lower valve ball arm 133 fit within valve guide apertures 129 and 148 which are formed in the upper and lower valve guides. In a preferred embodiment, valve guide apertures 129 and 149 are circular in shape and valve ball arms 133 and 135 are irregular in shape to provide cleaning and removal of debris. In a preferred embodiment upper valve ball arm 135 and lower valve ball arm 133 each provide a round surface area 138 shown shaded in FIG. 4, and a concave area 134. In an alternative embodiment the valve guide apertures 129 and 148 are irregular in shape and the valve ball arms 133 and 135 are circular in shape to provide cleaning and removal of debris.

Reversible valve ball assembly 132 reciprocates along the longitudinal axis of tubular housing 114. Valve ball assembly 132 comprised of spherical body or ball 136 and two valve ball arms, upper valve ball arm 135 and lower valve ball arm 133. The lower portion of external surface 137 of valve ball 136 seals with valve seat 140, as shown in FIG. 4. The lower portion of external surface 137 of the valve ball 136 and the upper surface of valve seat 140 mechanically engage to form a line contact seal once for each reciprocation cycle of valve ball assembly 132.

During the repeated reciprocation cycles of valve ball assembly 132, the lower portion of external surface 137 deteriorates due to repeated mechanical engagement and resulting stress and friction which occurs between valve seat 140 and lower spherical surface 137. Deterioration eventually wears away at lower valve ball surface 137 and seat 140 so that the lower valve ball surface 137 and upper surface of valve seat 140 will no longer form a line seal when engaged. To eliminate the problem and restore the seal, new sealing surfaces are required to replace worn lower valve ball surfaces 137 and upper surface of valve seat 140. The spherical valve ball assembly 132 may be removed, inverted and reinserted so that what was the upper portion 139 of the valve ball external surface is now the lower portion which mechanically engages valve seat 140.

Until the reversible valve ball is inverted, the upper valve ball surface 139 is not subjected to repeated contact with the valve seat 140, thus, the upper valve ball sealing surface 139 is not worn down by repeated contact with the valve seat. Thus the upper valve ball surface is "new" in that it has not deteriorated or worn against the seat 140. Thus, the upper valve ball surface 139, when inverted, can be utilized to provide a new smooth sealing surface which readily forms a seal with complementary valve seat 140.

Valve seat 140 can also be inverted to provide a "new" sealing surface to seal with upper valve ball surface 139. A conventional seat may be utilized in a preferred embodiment. Spherical valve ball 132 and the seat 140 can each be removed, inverted and reinserted to provide new sealing surfaces for the ball and the seat. The present invention is field serviceable to provide new sealing surfaces to replace worn sealing surfaces without the need for additional parts. The old and worn valve ball and seat sealing surfaces can be replaced in the field with new sealing surface which are provided by existing parts. Thus, the reversible check valve ball assembly of the present invention conserves time and money associated with obtaining replacement parts. Economic efficiency is critical to successful recovery in the oil industry where the high costs can become prohibitive.

Figure 7A:
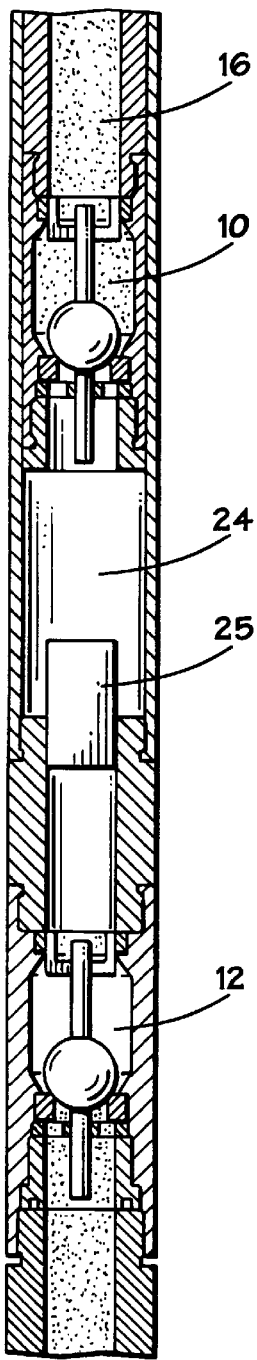
FIG. 7A is a cross-sectional diagram of a preferred pump apparatus showing a standing and traveling valve with the standing valve closed and the traveling valve closed.
Figure 7B:
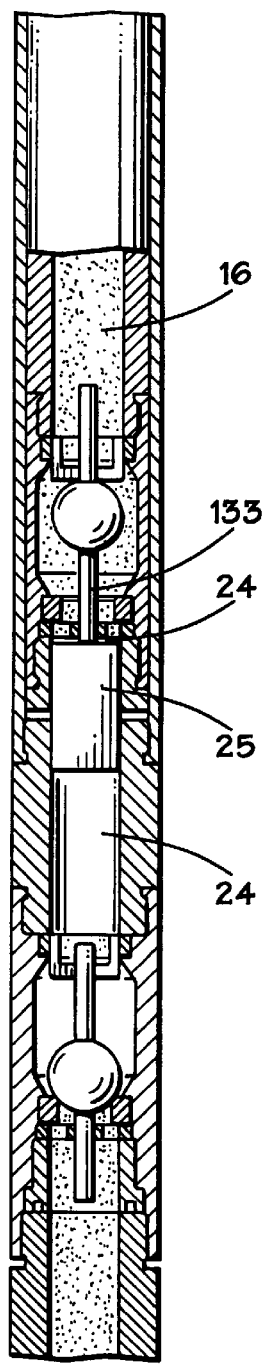
FIG. 7B is a cross-sectional diagram of a preferred pump apparatus showing a reduced volume pump chamber having a standing and traveling valve with the standing valve closed and the traveling valve open.
Figure 7C:
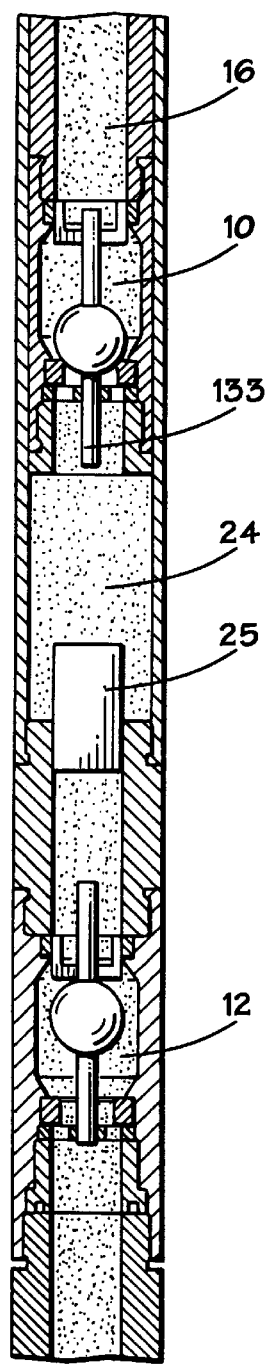
FIG. 7C is a cross-sectional diagram of a preferred pump apparatus showing a reduced volume pump chamber having a standing and traveling valve with the standing valve open and the traveling valve closed.

Turning now to FIGS. 5 and 6, in an alternative embodiment, the present invention provides an improved valve structure for preventing gas locking during pumping. Turning now to FIGS. 7A, 7B and 7C, a preferred gas breaker valve is shown in FIG. 7A. As shown in FIG. 7A, a pump is comprised of a traveling valve 10 and a standing valve 12. During pumping operations gas may enter the flow area 124 between the standing valve 12 and the traveling valve 10. The pressure of the trapped gas in flow area 124 holds the standing valve 12 closed. The hydrostatic weight of the fluid 16 above the traveling valve 10 prevents the traveling valve from opening. On the down stroke, the gas compresses causing the traveling valve to remain closed. In this instance, the pump is "gas-locked," however, should the pump plunger encounter an incompressible liquid on the down stroke, the traveling valve will open.

In FIG. 7B, the trapped gas has created sufficient pressure to hold the standing valve closed, preventing fluid 22 below the standing valve to enter the pump. The gas breaker structure, described in McConnell, U.S. Pat. No. 5,249,936 provides an elongated lower valve ball arm which mechanically engages a horizontal stopping bar member to force open the traveling valve at the bottom of a pump stroke. The traveling valve is forced by the stopping member to allow trapped gas to escape and prevent gas lock.

As shown in FIG. 7C, the structure of the present invention reduces the distance between traveling valve 10 and standing valve 12. As shown in FIG. 7B the lower stem of the symmetrical reversible valve ball of the present invention engages an elongated fin which protrudes from a transverse member fixed within the interior of the valve housing. Thus, the traveling valve moves downward and engages the elongated fin which opens the traveling valve to allow trapped gas to escape, breaking gas lock.

Returning to FIGS. 5 and 6, the present invention provides a raised fin which enables a shorter valve ball arm to be used to engage the fin and open the traveling valve to breaking a gas lock. In McConnell, a longer lower valve arm is provided to engage a stopping bar member. Thus, the McConnell valve plunger is not reversible because the lower ball arm is longer than the upper valve ball arm. The raised fin of the present invention enables a valve to use the reversible valve ball of the present invention without modification in the alternative gas breaking embodiment. The raised fin of the present invention also enables a pump to be built utilizing a shorter vertical distance between the standing valve and traveling valve reducing the pump or compression chamber 24 volume which occupies the space between the standing and traveling valves. The reduction in compression chamber volume increases the compression within the compression chamber 24 for a given displacement of a traveling valve. Thus a small displacement of traveling valve 10 results in a substantial increase in compression of gas trapped in the compression chamber 24. Increased compression of gas in the valve chamber creates additional pressure above the standing valve increasing the frequency at which the traveling valve opens due to the pressure in the valve chamber without relying on mechanical engagement of the reversible valve ball arm and the gas-breaker fin.

In FIGS. 5 and 6, a fin 25 is positioned under the traveling valve ball arm 133 so that the traveling valve ball's lower arm 133 engages the fin 25 as the pump plunger approaches the bottom of the down-hole pump stroke. As the pump stroke continues, the fin 25 forces the lower valve ball arm 133 up, forcing valve ball 136 up and out of its seat 140, opening the traveling valve to release any trapped gasses which may lock the pump.

The preceding is one example of a preferred embodiment of the present invention and is not intended to limit the scope or spirit of the present invention, which is defined by the following claims.

I claim:

1. A cageless down-hole rod pump check valve having an increased flow rate comprising:

(a) a tubular housing having an outside diameter substantially equal to an outside diameter of a pump plunger, having threads formed in an inside surface at a lower and upper end, said threads engaging the threads in a plunger pump barrel;

(b) an upper valve guide which fits within the tubular housing;

(c) a lower valve guide which fits within the tubular housing;

(d) a valve seat which fits within the tubular housing; and (e) a reversible valve ball having a center spherical portion and an upper and lower arm protruding radially in diametrically opposing directions and attached to the center spherical portion, the valve arms having alternately round and flat exterior surfaces which fit within the upper valve guide and lower valve guide, said upper and lower valve guides having circular apertures which receive said valve arms, said alternately rounded exterior surfaces being complementary with said circular apertures, said valve arms rotating within said apertures and scraping debris from apertures and said valve ball forming a seal between a lower surface of the center spherical portion and the valve seat.

2. The apparatus of claim 1 further comprising:

(f) a gas-breaker fin positioned below the check valve so that the lower valve ball arm of the reversible valve ball contacts the gas-breaker fin on each down stroke of the pump plunger forcing the check valve open.

3. The apparatus of claim 1 further comprising further comprising a gas-breaker fin positioned below the lower valve ball arm of the reversible valve ball so that the valve ball arm contacts the gas-breaker fin on each down stroke of a pump plunger thereby forcing the check valve open.

4. A down-hole rod pump check valve comprising:

(a) a tubular housing having an outside diameter substantially equal to an outside diameter of a pump plunger, the housing having threads formed in an inside surface at a lower and upper end, the threads engaging the threads in a plunger pump barrel;

(b) an upper valve guide which fits within the tubular housing, the upper valve guide comprising an upper annular member and an upper transverse member, the upper transverse member having an upper valve guide aperture;

(c) a lower valve guide which fits within the tubular housing, said lower valve guide comprising a lower annular member and a lower transverse member, the lower transverse member having a lower valve guide aperture;

(d) an annular valve seat which fits within the tubular housing, the annular valve seat having a first surface and a second surface; and (e) a reversible valve ball having a center spherical portion, the center portion having an upper and lower arm attached and protruding radially in diametrically opposing directions, the upper and lower arms sliding within the upper and lower valve guide apertures and enabling the valve ball to reciprocate along the longitudinal axis of the down-hole rod pump, the valve seat providing a limit to the longitudinal travel of the valve ball as the valve ball contacts the valve seat during reciprocation along the longitudinal axis, the valve ball and valve seat forming a seal upon contact between an upper valve seat surface and a lower valve ball surface wherein the upper valve guide transverse member comprises a longitudinal member interposed between and connecting the upper annular member and the upper transverse member, thereby enabling positioning of the upper valve guide aperture a variable distance along the longitudinal axis of the pump.

5. The down-hole rod pump check valve of claim 4 wherein said valve seat is symmetrical so that either side of the valve seat can be installed in the down-hole rod check valve facing the valve ball to form a seal when the valve seat contacts the reciprocating valve ball, so that the valve seat is reversible.

6. The down-hole rod pump check valve of claim 4 further comprising a gas-breaker fin positioned below the lower valve ball arm of the reversible valve ball so that the valve ball arm contacts the gas-breaker fin on each down stroke of a pump plunger thereby forcing the check valve open.

7. A down-hole rod pump check valve comprising:

(a) a tubular housing having an outside diameter substantially equal to an outside diameter of a pump plunger, the housing having threads formed in an inside surface at a lower and upper end, the threads engaging the threads in a plunger pump barrel;

(b) an upper valve guide which fits within the tubular housing, the upper valve guide comprising an upper annular member and an upper transverse member, the upper transverse member having an upper valve guide aperture;

(c) a lower valve guide which fits within the tubular housing, said lower valve guide comprising a lower annular member and a lower transverse member, the lower transverse member having a lower valve guide aperture;

(d) an annular valve seat which fits within the tubular housing, the annular valve seat having a first surface and a second surface;

(e) a reversible valve ball having a center spherical portion, the center portion having an upper and lower arm attached and protruding radially in diametrically opposing directions, the upper and lower arms sliding within the upper and lower valve guide apertures and enabling the valve ball to reciprocate along the longitudinal axis of the down-hole rod pump, the valve seat providing a limit to the longitudinal travel of the valve ball as the valve ball contacts the valve seat during reciprocation along the longitudinal axis, the valve ball and valve seat forming a seal upon contact between an upper valve seat surface and a lower valve ball surface; and a gas-breaker fin positioned below the lower valve ball arm of the reversible valve ball so that the valve ball arm contacts the gas-breaker fin on each down stroke of a pump plunger thereby forcing the check valve open.

8. The down-hole rod pump check valve of claim 7 wherein the upper valve guide transverse member comprises a longitudinal member interposed between and connecting the upper annular member and the upper transverse member, thereby enabling positioning of the upper valve guide aperture a variable distance along the longitudinal axis of the down-hole rod pump.

9. The down-hole rod pump check valve of claim 7 further comprising a gas-breaker fin positioned below the lower valve ball arm of the reversible valve ball so that the valve ball arm contacts the gas-breaker fin on each down stroke of a pump plunger thereby forcing the check valve open.

* * * * *